United States Patent [19]
Risley

[11] Patent Number: 5,832,786
[45] Date of Patent: Nov. 10, 1998

[54] GOLD WING HAND PROTECTOR

[76] Inventor: Robert Risley, 4606 West Rd., Debeque, Colo. 81630

[21] Appl. No.: 883,215

[22] Filed: Jun. 26, 1997

[51] Int. Cl.[6] .................................................. B62J 23/00
[52] U.S. Cl. ...................................... 74/551.8; 280/288.4
[58] Field of Search ....................... 74/551.8; 280/288.4, 280/304.3; 296/78.1

[56] References Cited

U.S. PATENT DOCUMENTS

| 568,024 | 9/1896 | Gorman | 74/551.8 X |
|---|---|---|---|
| 4,141,567 | 2/1979 | Scott | 74/551.8 X |
| 4,716,782 | 1/1988 | Jones | 74/551.8 X |

FOREIGN PATENT DOCUMENTS

| 120680 | 6/1927 | Switzerland | 296/78.1 |

Primary Examiner—Charles A. Marmor
Assistant Examiner—Mary Ann Battista
Attorney, Agent, or Firm—Peter Gibson

[57] ABSTRACT

A wind shield for each hand upon the hand grips of a Honda Gold Wing motorcycle is provided by a formed transparent acrylic plate attached to a bracket which is attached to the handlebar of the machine using an existing nut forward of the hand grip on the posterior of the handlebar which is associated with the attachment of the control lever.

15 Claims, 1 Drawing Sheet

GOLD WING HAND PROTECTOR

BACKGROUND OF THE INVENTION

1. Field of the Invention

The field of the present invention is generally that of hand protectors which are mounted upon handlebars, more particularly motorcycles, and specifically in order to protect the hands from wind as opposed to abrasion.

2. General Background

Wind chill factor is a commonly known, if sometimes imperfectly understood, phenomenon which relates a given true temperature and wind velocity with the temperature that would have an equivalent effect in heat dissipation upon a human without any wind. It is a useful indication of how much colder one is in a significant wind.

The riders of larger motorcycles are quite familiar with this phenomenon. Larger motorcycles are designed for and used by many to travel continuously for hours in the open at highway velocities. Large motorcycles readily travel as long as one cares to ride at velocities well over sixty miles per hour if desired. Even at moderate temperatures above freezing the 'wind chill factor' at sixty miles per hour is considerable. Larger motorcycles are hence commonly equipped with a windscreen which primarily shield the rider from what otherwise would be a rather chilling wind.

The handgrips, however, are typically laterally beyond the area of protection afforded by a windscreen. It is common for motorcycle riders to wear gloves for this reason and to provide protection against abrasion. A crash at over sixty miles per hour is not significantly cushioned by gloves, however, and the protection against abrasion is considered insignificant to the typical rider of a larger motorcycle.

The hands are more important to a motorcycle rider than to the driver of an automobile. While both use the hands to steer, the motorcyclist also uses the hands to control, typically, the clutch and a front brake as well as steering and control of other devices such as turn signal indicators.

When one's hands become chilled dexterity is lost and one's control of, and hence safety upon, a motorcycle is seriously impaired. While gloves help to avoid this condition gloves also are an impediment to sensitivity and control. Mittens are well known for being 'warmer', i.e. providing more effective insulation, than fingered gloves. A trade off is recognized. The 'warmer' the gloves the less sensitivity one's hands possess. It is hence considered desirable to reduce the need for insulation provided by gloves while riding a motorcycle and to do so by reducing the effective wind upon the hands while riding at velocities appropriate to a highway.

3. Discussion of the Prior Art

Many examples are known of attachments to the handlebars of bicycles and smaller motorcycles in order to protect the hands. Most seem concerned with protecting the hand in the event of collision. This is of great practical value to riders of smaller motorcycles who commonly lose control of their 'bikes' while on dirt trails. U.S. Pat. No. 4,716,782 is an example of a protective guard for a smaller motorcycle which is expected to obtain a horizontal attitude in the dirt upon occasion. U.S. Pat. No. 3,832,912 is another example. Neither is intended for a larger, 'road bike' as motorcycles intended only for pavement and capable of highway cruising are generally known. The riders of larger motorcycles, as discussed above, have different concerns.

The only known hand protector which is suited specifically to a larger motorcycle capable of cruising at highway speeds for as long as one desires is adapted specifically to BMW motorcycles. These devices are known as BMW Hand Protectors and are advertised as "(a)erodynamically formed from impact resistant plastic." (*Comp-A,* 1997) These devices are also only known in opaque black which is consistent with the styling characterizing BMW machines. BMW Heated Grips are also advertised alongside the Hand Protectors with a similar concern in mind. The attachment of the BMW Hand Protectors to the handlebars is particular to that manufacture, however, and cannot be attached to a Honda Gold Wing motorcycle, for instance, which possesses handlebars of significantly different structure than the BMW.

STATEMENT OF NEED

Honda Gold Wing motorcycles, which currently are available in 1100, 1200 & 1500 cc engine displacements, are very popular machines with long range, highway speed, motorcycle enthusiasts. Honda developed compound vortex controlled combustion technology for motorcycle engines which led to considerable success in motorcycle racing and also led to the Honda Civic line of automobiles which was first known as CVCC in recognition of this technology. Honda builds what is considered by many to be the overall best large, highway capable, motorcycle in the world. One reason cited by Gold Wing enthusiasts for this belief is the superior comfort and control afforded on longer rides.

Both comfort and control are important to safety on longer rides and safety is considered the primary concern addressed herein. The rider of a motorcycle is basically exposed. This is fundamental to the enjoyment obtained from riding a motorcycle. Safety is acquired from the ability to see about one without impediment and control one's vehicle, as opposed to the driver of a car where one has a protective cage about them and one's field of view is necessarily limited. Limitation of one's field of view upon a motorcycle is dangerous to the rider of the same. An unimpeded field of view is considered vital to the safety of a highway speed motorcycle rider and any infringement of that full field of view is considered a danger.

Because a BMW Hand Protector will not fit on a Honda Gold Wing and because the BMW Hand Protector is opaque there is considered to exist a need for a hand protector which will readily attach to a Honda Gold Wing handlebar in an effective disposition and which will not impede the field of view of the rider of the motorcycle.

SUMMARY OF THE INVENTION

Objects of the Invention

The principal object of the present invention is a device which can be readily attached to a Honda Gold Wing motorcycle which will protect the hands from wind chill and which will not impede the view of the rider.

An ancillary object of the present invention is a device which can be readily attached to a Honda Gold Wing motorcycle with the removal and replacement of a single nut already existing upon each side of the handlebar which device will protect the hands from wind chill and which will not impede the view of view of the rider.

Another ancillary object of the present invention is a single device which can be readily be attached to either side of a Honda Gold Wing motorcycle which will protect the hands from wind chill and which will not impede the view of the rider.

Auxiliary objects of the present invention include a device which can be readily attached to a Honda Gold Wing motorcycle which will protect the hands from wind chill and which will not impede the view of the rider which is economic, durable and lightweight.

Principles Relating to the Present Invention

In order to achieve the objectives set forth above the relevant portion of the handlebar structure characterizing a Honda Gold Wing motorcycle is first considered. Each end of this handle bar possesses a hand grip from which a control lever is disposed forward of, spaced apart from, and at a small incline to the grip. The control lever upon either side each possess an attachment to the handlebar which is inclusive of bolt and a nut on the posterior of the bar forward of the hand grip along the bar. Using this posterior nut facilitates fastening of a device to the handlebar end proximate the hand grip upon either side without an additional cincture about the handlebar and minimizes the hardware required for attachment. A bracket of appropriate size and shape with an aperture sized for the particular bolt upon which this posterior nut threads onto is thus suggested.

The portion of the bracket which is held by this nut must be sufficiently thin to enable this nut to still thread fully onto the associated bolt with the bracket thereupon. The bracket must possess sufficient strength to maintain the device in position in operation under which considerable force from the wind is placed upon the device concerned. Steel is suggested for construction of the bracket, preferably chrome plated or stainless.

The main body of the device must fully shield a hand upon the hand grip from the wind but at the same time present no impediment to the field of view of the rider. A plate of substantially uniform thickness of transparent plastic of superior durability is suggested, preferably about an eighth inch thick acrylic which possesses good strength, impact resistance, and transparency. In order to optimize the use of material the forward or leading edge of the plate is the widest part. Attachment to the bracket by use of apertures through the plate proximate the leading edge and through the bracket with attachment members, preferably bolts, through aligned pairs of apertures, each preferably fastened with a lock nut, is recommended.

Because it is further desired to present an aerodynamic forward surface facing into the wind, it is further recommended that the plate be formed to present a modestly convex forward surface and commensurately concave rear surface. Because it is desired to use the a plate of the same configuration upon each side with this aerodynamic shape it is suggested that the plate be rotated one hundred eighty degrees about a horizontal axis normal to the plate, keeping the convex surface forward, in order to achieve a right hand and left hand orientation.

Because the bracket attaches to the underside of the handlebar and the plate must be disposed in front of the hand grip, forward of the control lever, this rotation affects the attachment to the bracket. Using two apertures through each bracket and three apertures through the plate proximate the leading edge with the spacing between these three apertures equivalent to the distance between the two holes through the bracket enables attachment thereto at the same elevation with regard to the hand grip after rotation of the plate in order to achieve right and left hand orientation. The three apertures through the plate are arranged in a substantially linear disposition and the medial aperture is aligned with the lower of the two apertures through the bracket with either distal aperture through the plate becoming the upper aperture aligned with the upper aperture through the bracket depending upon whether it is on the right or left hand side.

Other objects and advantages of the present invention may become apparent in a reading of the detailed description of the preferred embodiment below, especially if made with reference to the drawing attached hereto and presently described in brief.

DETAILED DESCRIPTION OF THE PREFERRED EMBODIMENT

Figure 1:
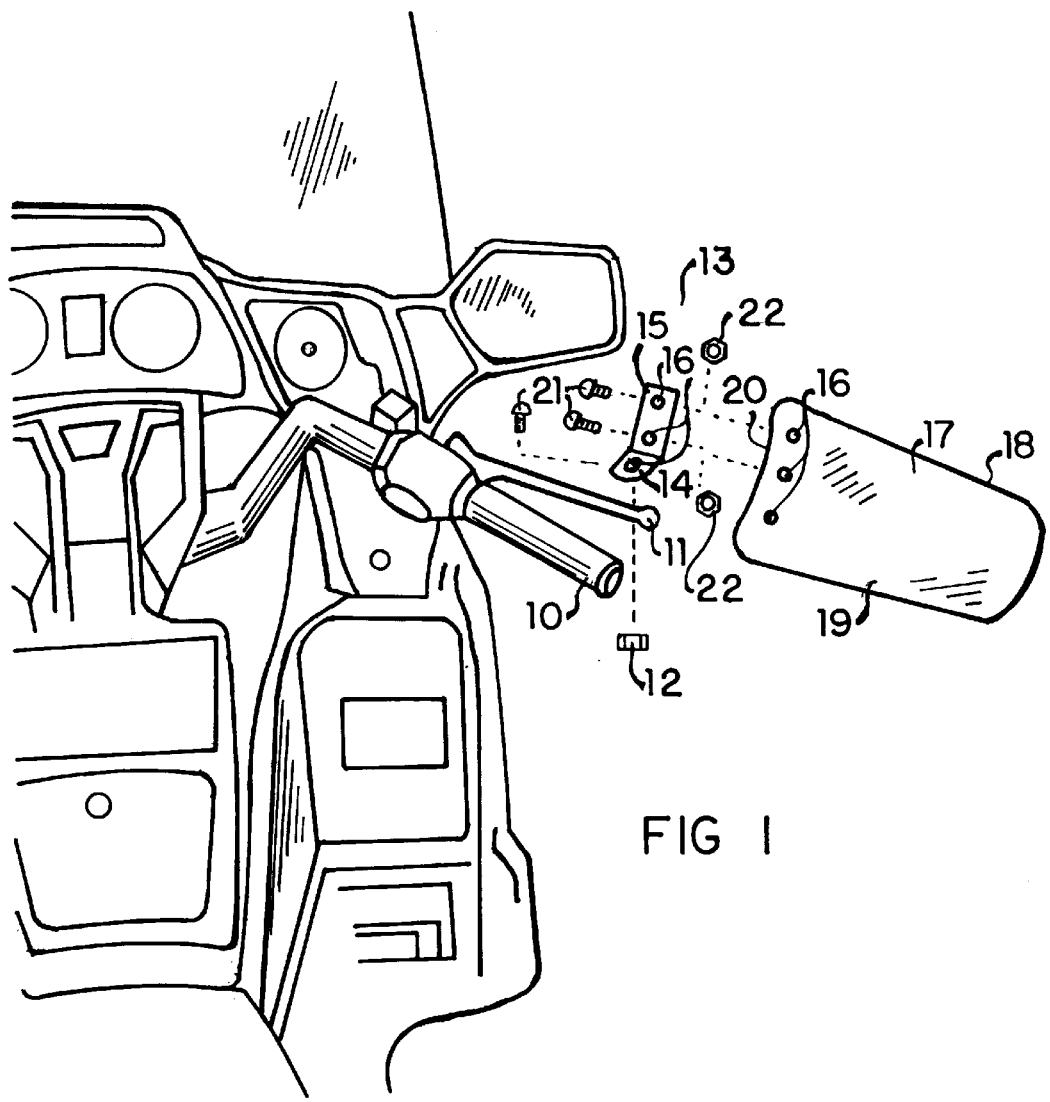
FIG. 1 is an isometric explosion view of a preferred embodiment of the principles relating to the present invention shown in relation to the right side of a Honda Gold Wing motorcycle depicting the attachment intended.

FIG. 1 depicts the right hand side of a Honda Gold Wing motorcycle from the perspective of a rider of the same and the present invention in an exploded view with the intended attachment forward of the hand grip 10 and the control lever 11 indicated. Forward of the hand grip 10 along the handlebar an existing nut 12 is also shown detached from the posterior of the attachment of the control lever 11 to the handlebar. This existing nut 12 is removed and the bracket 13 is attached with it.

As may be clearly seen, the bracket 13 has a lower portion 14 and an upper portion 15, the former possessing one aperture 16 therethrough, the latter two apertures 16 therethrough. The aperture 16 through the lower portion 14 of the bracket 13 is sized to fit over the bolt exposed by removal of the existing nut 12. Replacement of the existing nut 12 after the bracket 13 has been so positioned obtains attachment of the bracket 13 to the handlebar of the Gold Wing. The bracket 13 possesses an angle between the lower portion 14 and the upper portion 15 which places the upper portion 15 in a substantially vertical disposition when the bracket 13 is properly secured with the existing nut 12.

The main body of the hand protector which is comprised of the present invention is basically a transparent plate 17 which is preferably formed to present a convex forward face 18 and a concave rear face 19. This plate 17 prior to forming possesses a substantially rectangular shape with the longitude intended to be disposed substantially horizontal. The leading edge 20 is preferably the widest portion of the plate 17 and several apertures 16 are, as clearly depicted, disposed in a linear arrangement parallel and proximate to this leading edge 20.

The distance between either distal aperture 16 and the medial aperture 16 of the three is substantially equivalent to the distance between the two apertures 16 through the upper portion 15 of the bracket 13. As indicated in FIG. 1 attachment of the plate 17 to the upper portion 15 of the bracket 13 is effected by aligning the upper and medial apertures 16 through the plate 17 with the two apertures 16 through the upper portion 15 of the bracket 13 and passing a bolt 21 through each pair of so aligned apertures 16 and threading a lock nut 22 down tight upon each bolt 21. A washer might be used in contact with the plate 17 and standard nuts might also be used but a lock nut 22 is preferred instead.

The bottom aperture 16 of the three through the plate 17 is not utilized. It exists in order to become the upper aperture 16 of the three on the other side when the plate 17 is rotated one hundred eighty degrees about a horizontal axis normal to the plate 17 so that a pair of identical plates 17 maybe utilized as both right and left hand protectors both presenting a convex forward face 18 and concave rear face 19 upon the same elevation forward of the control lever 11. Thus the bracket 13 and the plate 17 used on either side may be identical along with the bolts 21 and lock nuts 22 preferably utilized to attach the two together.

The bracket 13 is preferably made of steel and is further preferably chromed or of a good quality stainless steel, chrome plated carbon steel being most preferred. The plate 17 is preferably acrylic and about one eighth or three sixteenths of an inch thick. It is not necessary that the plate 17 be fastened to the bracket with bolts 21 and lock nuts 22 though this also is preferred. As mentioned earlier standard nuts might be used with or with out washers and the washers might be of the locking variety. More fundamentally, rivets might replace bolts 21 and lock nuts 22 altogether and the bolts 21 and locking nuts 22 depicted in FIG. 1 are considered to be representative of fastening members which are passed through the aligned pair of apertures 16 and which fasten the plate 17 to the upper portion 15 of the bracket 13. The number of apertures 16 through the upper portion 15 of the bracket 13 might be other than two and the number of apertures 16 through the plate 17 might be other than three, but these are the preferred quantities for fairly obvious mechanical reasons.

More significantly, the plate 17 intended for the left hand side might differ from the plate 17 used for the right hand side but the preferred identical construction is also considered to possess obvious advantages in manufacture. The plate 17 furthermore does not require forming in order to present a convex forward face 18 and a concave rear face 19 but this aspect again is considered to convey obvious benefit with regard to aerodynamics and the effectiveness of the device in reducing the draft upon a hand gripping the hand grip 10 in operation. And the plate 17 need not be shaped precisely as depicted in FIG. 1 though having the leading edge 20 substantially being the widest part of the plate 17 affords aerodynamic and functional advantage similar to the forming of the plate 17. The rounded corners of the plate 17 are considered to be an obvious safety feature as well being aerodynamically advantageous and also are considered to add considerable aesthetic appeal.

It is further recommended that the apertures 16 through the plate 17 be about one quarter or five sixteenths of an inch in diameter and that the apertures 16 through the upper and the lower portions 15, 14 of the bracket 13 be of similar dimension. The bolts 21 and lock nuts 22 recommended are one inch long six millimeter diameter and six millimeter DIM 985, respectively. The bracket as depicted and preferred has a lower portion 14 which measures one and one half inches length and an upper portion 15 of three and one half inches length, the preferred width being about one and one half inches. The preferred dimensions of the plate 17 are ten inches length and six inches height.

All of these particulars are solely intended to provide what is regarded as the best manner of making a device in accordance with the principles relating to the present invention. The best and only known manner of using said device is attachment as described above to the handlebar of a Honda Gold Wing using the existing nut 12 located on the posterior of the handlebar forward of the hand grip 11 and riding the Gold Wing as desired preferably without gloves or with the least bulky gloves sufficient to provide comfort. None of the foregoing is intended nor may be construed as restrictive of the scope of the invention nor of the rights and privileges obtained by Letters Patent which are sought hereby.

I claim:

1. A device for attachment to a control lever which is attached to a handlebar of a motorcycle, said device comprising:

a bracket, a plate, and a nut which is adapted to attach the control lever to the handlebar;

said bracket possessing a lower portion and an upper portion with a substantial angle between said portions, said lower portion possessing an aperture therethrough and said upper portion possessing at least one aperture therethrough;

said plate being substantially transparent, possessing a substantially uniform thickness, two opposed faces, a leading edge and at least one aperture therethrough proximate said leading edge, at least one said aperture through said plate alignable with at least one said aperture through said upper portion of said bracket forming an aligned pair of apertures through which a fastening member may be passed and said plate fastened to said upper portion of said bracket;

said upper portion of said bracket adapted to be disposed substantially vertical, forward of and spaced apart from the control lever of the motorcycle when the lower portion of said bracket is attached to the handlebar of said motorcycle using said nut;

attachment of said plate to said upper portion of said bracket with at least one said fastening member passed through at least one said aligned pair of apertures and attachment of said lower portion of said bracket to said handlebar using said nut thereby disposing said plate forward of and spaced apart from said control lever and forward of a hand grip of said motorcycle thereby shielding a hand upon said hand grip from wind associated with forward movement of said motorcycle and the chill associated with said wind.

2. The device of claim 1 wherein said plate is constructed of acrylic plastic.

3. The device of claim 1 wherein said plate is approximately one eighth of an inch thick.

4. The device of claim 1 wherein said plate is approximately five sixteenths of an inch thick.

5. The device of claim 1 wherein said plate is formed such that one of said two opposed faces is convex which is intended for forward disposition and the other said face is concave which is intended for rearward disposition.

6. The device of claim 1 wherein rotation of said plate one hundred eighty degrees about an axis normal to said two opposed surfaces of said plate enables said plate to be positioned upon either side of said motorcycle at the same elevation forward of the control lever.

7. The device of claim 6 wherein the quantity of apertures through said upper portion of said bracket is two and the quantity of apertures through said plate is three.

8. The device of claim 1 wherein said at least one fastening member is comprised of a bolt and nut.

9. The device of claim 8 wherein said nut is a locking nut.

10. The device of claim 1 wherein said bracket is constructed of steel.

11. The device of claim 10 wherein said bracket is constructed of chrome plated steel.

12. The device of claim 10 wherein said bracket is constructed of stainless steel.

13. The device of claim 1 wherein said plate is of substantially rectangular shape.

14. The device of claim 13 wherein said leading edge of said plate is the widest part of said plate.

15. The device of claim 13 wherein said plate possesses rounded corners.

* * * * *